(12) United States Patent
Zhou

(10) Patent No.: US 12,689,435 B2
(45) Date of Patent: Jul. 21, 2026

(54) SINGLE-AXIS OPTICAL FREE-SPACE COMMUNICATION

(71) Applicant: U.S. Army DEVCOM, Army Research Laboratory, Adelphi, MD (US)

(72) Inventor: Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 245 days.

(21) Appl. No.: 18/369,246

(22) Filed: Sep. 18, 2023

(65) Prior Publication Data

US 2025/0096892 A1 Mar. 20, 2025

(51) Int. Cl.
| | |
|---|---|
| *H04B 10/00* | (2013.01) |
| *H04B 10/11* | (2013.01) |
| *H04B 10/50* | (2013.01) |
| *H04J 14/00* | (2006.01) |

(52) U.S. Cl.
CPC ........... *H04B 10/11* (2013.01); *H04B 10/501* (2013.01)

(58) Field of Classification Search
CPC ... H04B 10/11; H04B 10/112; H04B 10/1123; H04B 10/1125; H04B 10/114; H04B 10/1143; H04B 10/116; H04B 10/118
See application file for complete search history.

(56) References Cited

U.S. PATENT DOCUMENTS

| | | | |
|---|---|---|---|
| 11,280,885 B2 | 3/2022 | Stann et al. | |
| 11,454,859 B1 | 9/2022 | Cho et al. | |
| 2016/0022178 A1* | 1/2016 | Wang .................... | A61B 5/6887 |
| | | | 600/316 |
| 2018/0039032 A1* | 2/2018 | Graves ............... | H04B 10/1123 |
| 2022/0345221 A1* | 10/2022 | Mitchell ............ | H04B 10/1121 |
| 2023/0093006 A1* | 3/2023 | Scott .................... | H04B 10/294 |
| | | | 398/72 |
| 2023/0113535 A1 | 4/2023 | Zhou | |

OTHER PUBLICATIONS

Sang-Yen Cho and Weimin Zhou, "Meta Surface-Based Active Retroflector," U.S. Appl. No. 18/099,278, filed Jan. 20, 2023.

* cited by examiner

*Primary Examiner* — Daniel G Dobson
(74) *Attorney, Agent, or Firm* — Eric B. Compton

(57) ABSTRACT

A single-axis optical free-space communication device is described. The optical communication device may interact with entities that include or utilize elements such as retroreflectors. The optical communication device may be utilized for applications such as positioning, navigation, and/or timing (PNT), two-way communication, and/or other appropriate applications. The communication device may generate an optical output via a laser transmitter, optical fiber, and collimation lens. The optical communication device may receive optical inputs via the collimation lens, a photodetector, and receiver electronics. The optical communication device may utilize a single communication axis for transmission and reception by running an optical fiber transmission output through the center of an annular photodetector that receives reflected responses from the retroreflectors.

22 Claims, 10 Drawing Sheets

Transmit via optical fiber
and collimation lens

Transmit via optical fiber
and collimation lens

Receive via collimation
lens and photo detector

Offset from focal point
to photo detector
eliminates need for
precise alignment

700

Communication

Locate and identify retroreflector ~ 910

Receive retroreflector information ~ 920

Utilize received information ~ 930

Open communication channel with retroreflector ~ 940

SINGLE-AXIS OPTICAL FREE-SPACE COMMUNICATION

GOVERNMENT INTEREST

The invention described herein may be manufactured, used and licensed by or for the U.S. Government.

CROSS-REFERENCE TO RELATED APPLICATIONS

U.S. Patent Publication No. 2023/0113535A1, published on Apr. 13, 2023 is incorporated by reference herein. U.S. patent application Ser. No. 18/099,278 is incorporated by reference herein.

FIELD OF THE INVENTION

The invention relates to free-space optical communication devices, systems, and methods.

BACKGROUND OF THE INVENTION

Existing free-space optical communication solutions require precise alignment that is difficult to achieve and requires expensive equipment at both a transmitter and receiver.

Therefore, there exists a need for an optical communication solution that does not require precise alignment and utilizes a single transmitter/receiver.

BRIEF SUMMARY OF THE INVENTION

An optical transmitter/receiver of some embodiments may provide single-axis optical free-space communication. The optical transmitter/receiver may interact with entities that include or utilize elements such as retroreflectors. The optical transmitter/receiver may be utilized for applications such as positioning, navigation, and/or timing (PNT), two-way communication, and/or other appropriate applications. The optical transmitter/receiver may operate across relatively large distances (e.g., as utilized for satellite communication) or at closer ranges (e.g., as utilized for light fidelity or Li-Fi communications).

An optical transmitter/receiver of some embodiments may generate an optical output via a laser transmitter, optical fiber, and collimation lens. The optical transmitter/receiver of some embodiments may receive optical inputs via the collimation lens, a photodetector, and receiver electronics. The optical transmitter/receiver of some embodiments may utilize a single optical axis for transmission and reception.

The optical transmitter/receiver of some embodiments is an improvement over existing solutions which require two-axis communication with expensive transmission equipment at each communicating entity (e.g., a laser transmitter, collimation lens, positioning and/or alignment components, transmitter/receiver electronics, etc.). In contrast, the optical transmitter/receiver of some embodiments uses a single axis for transmission and reception, where the other communicating entity may include or utilize only a retroreflector collocating with an optical receiver. The retroreflector may be utilized without alignment components, transmitter/receivers, etc. The retroreflector be an "active" retroreflector that may include an active modulation capability to encode the reflected optical beam, thereby sending information back to the optical transmitter/receiver for two-way communication.

Existing solutions must be precisely aligned along each axis and focusing the received light into a single mode fiber or a small area (e.g., fifty to one hundred micrometers) high speed photodetector. Due to the are turbulence and alignment errors, the focused light spot may move out of fiber or photodetector area. For instance, a typical fiber (e.g., a fiber having a nine-micron diameter) may be associated with a communicating entity that moves or jumps many times the diameter of the fiber (e.g., two-hundred-micron movements of an aircraft due to turbulence). Therefore, existing solution often requires an expensive adaptive optics device to actively correct the optical beam and mitigate the air turbulence problems. The optical transmitter/receiver of some embodiments may utilize a relatively large photodetector (e.g., having a diameter of up to a few millimeters) that is offset from the focal point of the collimation lens, such that the received light may always caught by the photodetector. A photodetector having a larger area may reduce the bandwidth, but there is existing transimpedance amplifier design that can increase the bandwidth for larger detectors.

Existing solutions require beacon signals, which expose the location of each communicating entity. This is in contrast to the more secure optical transmitter/receiver of some embodiments that does not utilize beacon signals to locate other entities. The single focused beam of the optical transmitter/receiver of some embodiments is much more difficult to intercept.

Existing PNT solutions, such as global positioning system (GPS)-based solutions can be jammed or spoofed by bad actors. The free-space optical transmitter/receiver of some embodiments provide optical PNT solution which cannot be spoofed or jammed, as the optical signal is generated by the transmitter/receiver and the return signal provided via a retroreflector may be verified with respect to the transmitted signal.

BRIEF DESCRIPTION OF THE DRAWINGS

The novel features of the disclosure are set forth in the appended claims. However, for purpose of explanation, several embodiments are illustrated in the following drawings.

DETAILED DESCRIPTION OF THE INVENTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide single-axis free-space optical communication.

Figure 1:
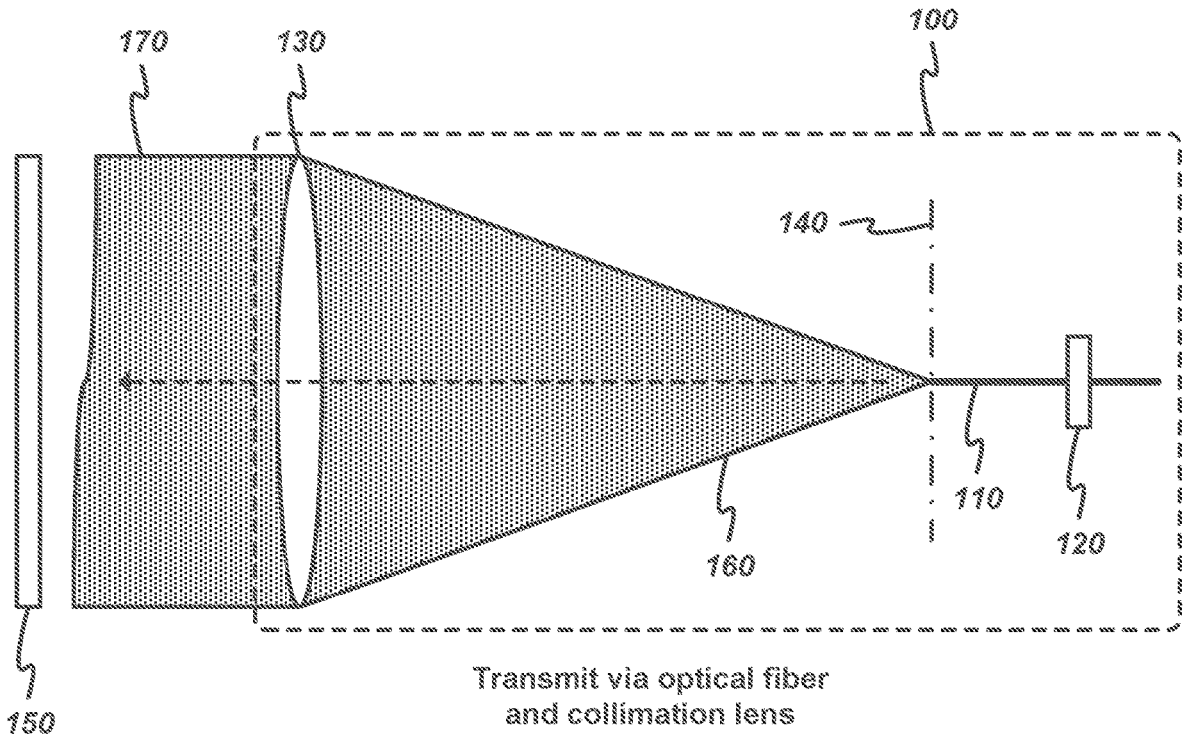
FIG. 1 illustrates an example overview of one or more embodiments described herein, in which an optical transmitter/receiver of one or more embodiments transmits an optical signal.

FIG. 1 illustrates an example overview of one or more embodiments described herein, in which an optical transmitter/receiver 100 (or "optical communication device") of one or more embodiments transmits an optical signal. As shown, in this example the optical transmitter/receiver 100 may include an optical fiber 110, photodetector 120, and/or collimation lens 130. The optical fiber 110 and/or photodetector may be associated with focal point 140 as shown. The optical transmitter/receiver 100 may interact with one or more retroreflectors 150.

Optical transmitter/receiver 100 may include various other components and/or features that will be described in more detail below in reference to FIG. 5 and FIG. 6. Returning to FIG. 1, optical transmitter/receiver 100 may be, include, and/or utilize various electronic and/or mechanical components that are able to produce or emit an optical output.

Optical fiber 110 may be capable of emitting light produced by various sources, such as a light amplification by stimulated emission of radiation ("laser") transmitter. Optical fiber 110 may include materials such as glass and/or plastic. Optical fiber 110 may include multiple glass or plastic fibers arranged in parallel. Some embodiments of the optical transmitter/receiver 100 may utilize, for example, an optical fiber 110 with a nine-micron glass core and an overall diameter of one hundred twenty-five microns. Different embodiments of the optical transmitter/receiver 100 may include or utilize different types or sizes of optical fiber 110, as appropriate for a given application.

Photodetector 120 may have an annular or flat ring shape with a through-hole at the center such that optical fiber 110 may pass through the photodetector 120 such that the photodetector at least partially surrounds a portion of the optical fiber 110 as shown. In some embodiments, the photodetector 120 may have a diameter of two to three millimeters. Photodetector 120 may include indium gallium arsenide (InGaAs) in some embodiments.

In some embodiments, a disc-shaped photodetector 120 may be etched to generate a through-hole in the center of the disc. Such etching may include multiple operations, depending on the components of the photodetector 120. For example, an etch process may include lithography (to identify the etch location), etching of a silicon dioxide (SiO2) layer, dry or wet etching the InGaAs active layer, dry or wet etching an indium phosphide (InP) substrate, and etching away gold or other conductors. Alternatively, the etch process may be performed in reverse order (e.g., by etching back-to-front rather than front-to-back). In some embodiments, a precision laser cutting machine may be used to cut a hole and wet chemical etching may be used to remove active areas of the photodetector 120 that were damaged by the laser cutting. In some embodiments, an annular photodetector 120 may be fabricated to include a through-hole in the center, where the substrate may be removed at the hole location. Different photodetectors 120 may include various different layers or materials that may be associated with various different etch processes and/or operations.

Collimation lens 130 may narrow the light emitted by the optical fiber 110 to form a cylindrical output at the output side of the collimation lens 130, narrowing the conical output emitted from the optical fiber 110. Different embodiments may include differently sized collimation lenses 130, as appropriate for various operating conditions. For example, a collimation lens 130 with a diameter of one inch to three inches may be utilized to communicate over a one-kilometer range (or more). Collimation lens 130 has a round shape in this example.

Focal point 140 may be associated with the end or output of optical fiber 110 during transmission, where the emitted light may spread out until reaching the collimation lens 130 as shown.

Retroreflector 150 may be, utilize, or include, one or more devices and/or surfaces that reflect radiation back to a source with minimum scattering. The retroreflector 150 may operate with a wide range of angle of incidence, such that radiation from various directions or orientations is able to be reflected back to a source, such as optical transmitter/receiver 100. U.S. Patent Publication No. 2023/0113535A1 describes active and passive retroreflectors 150 in more detail.

During transmission, optical transmitter/receiver 100 may produce a light output 160 as shown, from a transmission axis that runs along the center of optical fiber 110. The emitted light output 160 may spread out from focal point 140 (located at an output or end of optical fiber 110) until reaching the collimation lens 130. In this example, a collimated light output 170 may be emitted from the collimation lens 130 in a cylindrical shape as shown. The collimated light output 170 may be received at retroflector 150, where the properties of the retroflector 150 eliminate the need for precise alignment between the output of optical transmitter/receiver 100 and the retroflector 150.

Figure 2:
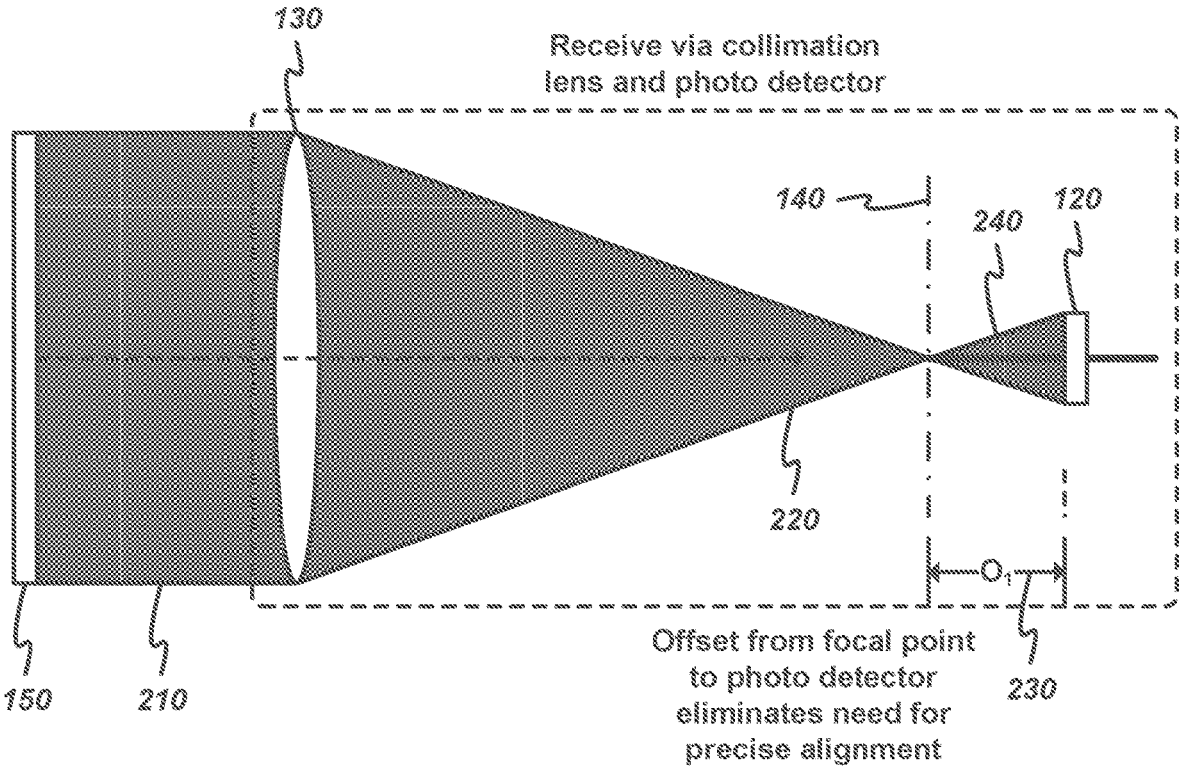
FIG. 2 illustrates an example overview of one or more embodiments described herein, in which the optical transmitter/receiver of one or more embodiments receives an optical signal.

FIG. 2 illustrates an example overview of one or more embodiments described herein, in which the optical transmitter/receiver 100 of one or more embodiments receives an optical signal.

During reception, reflected light 210 from retroreflector 150 may be received by optical transmitter/receiver 100 via the collimation lens 130 as shown. The collimation lens 130 may focus the reflected light, as shown, to focal point 140, providing focused reflected light 220 to the optical transmitter/receiver 100. The photodetector 120 may have a hole in the center so that the fiber transmitter may pass through the photodetector 120. The photodetector 120 may be located an appropriate distance from the end of optical fiber 110 such that the return focal point 140 is aligned with the output of the optical fiber 110.

Photodetector 120 may be offset from focal plane 140 by focal point offset $O_1$ 230. Focal point offset $O_1$ 230 may be sized relative to the outer diameter of photodetector 120. For example, focal point offset $O_1$ 230 a ratio of eighty percent to one-hundred twenty percent of the diameter of photodetector 120. Thus, for a photodetector 120 with a three millimeter diameter, for example, the focal point offset $O_1$ 230 may be between two-and-four-tenths millimeters and three-and-six-tenths millimeters. As the signal returned from the retroreflector 150 passes the focal point 140, the light spreads out as shown over the range of the focal point offset O₁ 230, allowing the returned light 240 to be received at the photodetector 120 even if there is light beam deformation due to the turbulence.

Figure 3:
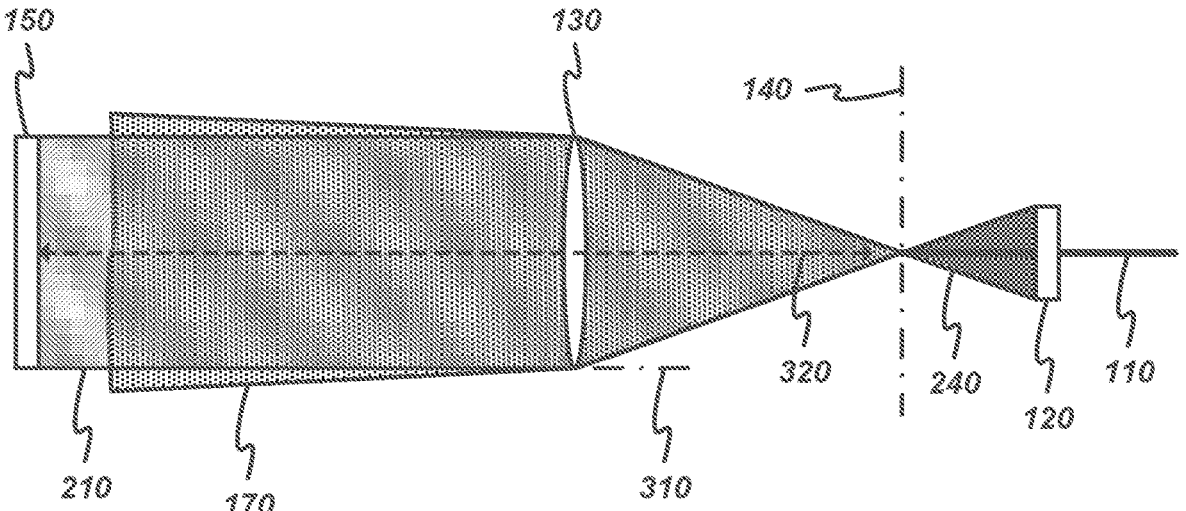
FIG. 3 illustrates a side elevation view of the optical transmitter/receiver of one or more embodiments described herein, in which the optical transmitter/receiver communicates with a perfectly aligned retroreflector.

FIG. 3 illustrates a side elevation view of the optical transmitter/receiver 100 of one or more embodiments described herein, in which the optical transmitter/receiver 100 communicates with a perfectly aligned retroreflector 150.

In this example, a focal position of collimation lens 130 may be offset relative to the focal point of optical fiber 110, such that, as shown, the emitted light spreads out relative to the outer edge of the collimation lens 130, represented by line 310, which is parallel to the axis of transmission along optical fiber 110. The focal position of collimation lens 130 may be offset such that the collimation lens 130 is closer to the focal point of optical fiber 110 than a distance that produces perfect cylindrical collimation. The offset relative of the focal position of the collimation lens 130 may depend on various relevant factors (e.g., size of the collimation lens 130, size of the retroreflector 150, expected turbulence or other operating conditions). As one example, a two to three inch collimation lens 130 may have a focal point that is one or two inches away and the offset relative of the focal position of the collimation lens 130 may be several millimeters. This cone shaped transmitted light beam may allow more tolerance to point and find a retroreflector 150 since the beam covers a larger area.

Direct optical path 320 may be coincident to the transmission axis along optical fiber 110 and may run through the center of collimation lens 130 and be received at the center of retroreflector 150 as shown. Returned light 240 may be received at photodetector 120 as shown, centered and extending to the outer rim of photodetector 120 in this example.

Use of a collimation lens 130 that is offset from the focal position provides more alignment tolerance, as retroreflectors 150 outside (or partially outside in this example) a cylindrical beam location (e.g., as defined by line 310) may still be able to be detected by the optical transmitter/receiver 100.

Even if the retroreflector 150 is oriented with an angle with respect to the incident light (e.g., the optical axis associated with the laser transmitter), reflected light 210 may pass through collimation lens 130 to produce focused reflected light 220. Returned light 240 may be received at photodetector 120.

Figure 4:
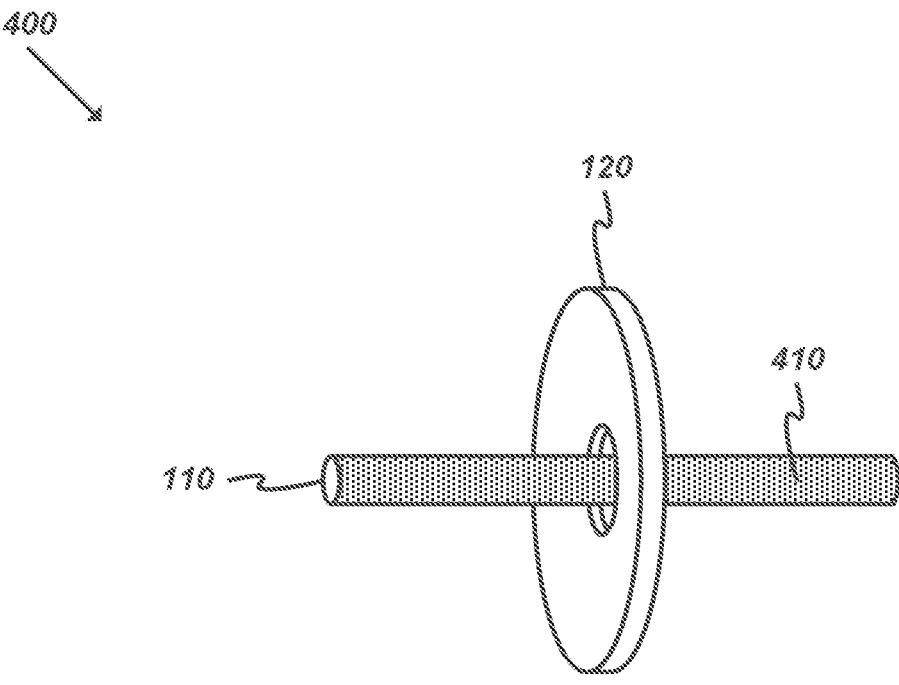
FIG. 4 illustrates a front, right-side perspective view of optical transmission and reception components of one or more embodiments described herein.

FIG. 4 illustrates a front, right-side perspective view of optical transmission and reception components 400 of one or more embodiments described herein. As shown, optical transmission and reception components may include optical fiber 110, photodetector 120, and opaque coating 410. Opaque coating 410 may shield the optical fiber 110 such that transmitted light is not received by the photodetector 120, thus eliminating crosstalk or noise issues. With the opaque coating 410, the diameter of optical fiber 110 may be about two hundred fifty microns in some embodiments.

In this example, the optical fiber 110 has a cylindrical shape and passes through a round through-hole in the photodetector 120. The photodetector 120 has an annular, or flat disk, shape. One of ordinary skill in the art will recognize that different embodiments may have various different dimensions, relative dimension, and/or variations in shape, as appropriate for different applications. The single annular photodetector 120 with a center hole may be replaced by multiple photodetectors surrounding the optical fiber 110. However, electrically connecting multiple photodetectors adds complication.

Figure 5:
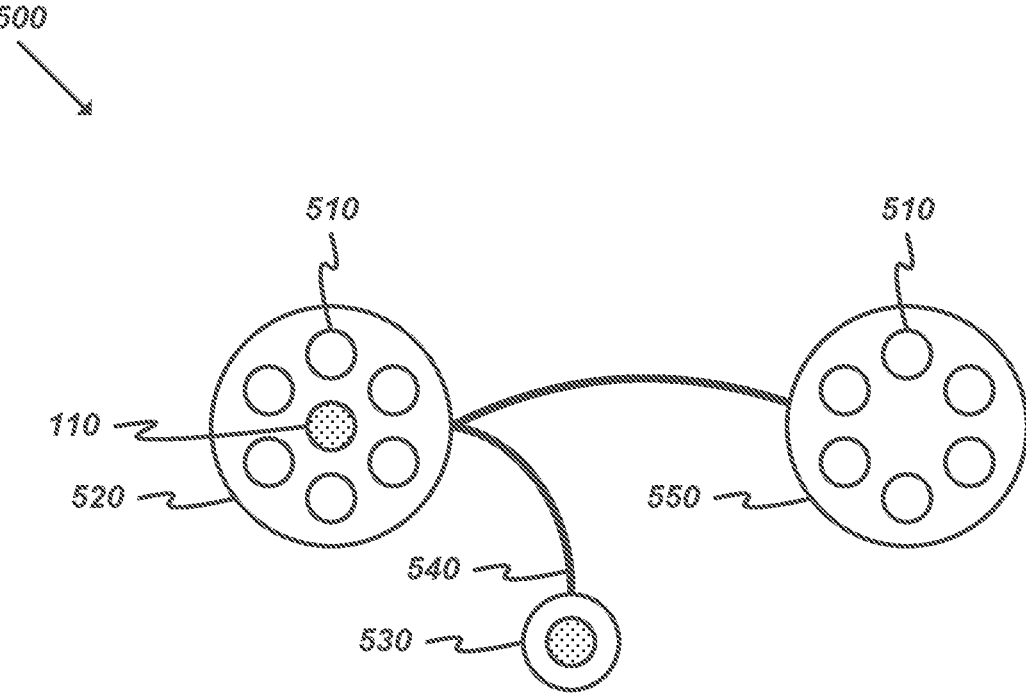
FIG. 5 illustrates a side elevation view of alternative optical transmission and reception components of one or more embodiments described herein.

FIG. 5 illustrates a side elevation view of alternative optical transmission and reception components 500 of one or more embodiments described herein. Alternative optical transmission and reception components 500 may replace optical transmission and reception components 300 in some embodiments. The alternative optical transmission and reception components 500 may replace the annular photodetector with multiple large core multimode fibers 510 that may form a fiber bundle 520 such that the laser transmitter optical fiber 110 is located at the center of the fiber bundle 520, and six or more large core multi-mode fibers 510 may receive the returning light. The fiber bundle 520 may be divided into multiple parts. The center fiber 110 may be connected to the transmission laser via a laser coupling 530 (e.g., an end of optical fiber 110) and associated fiber cable 540. The rest of large-core fiber bundle 520 may form a receiver fiber bundle 550 that may send returned light to a regular circular shaped photodetector 120.

Figure 6:
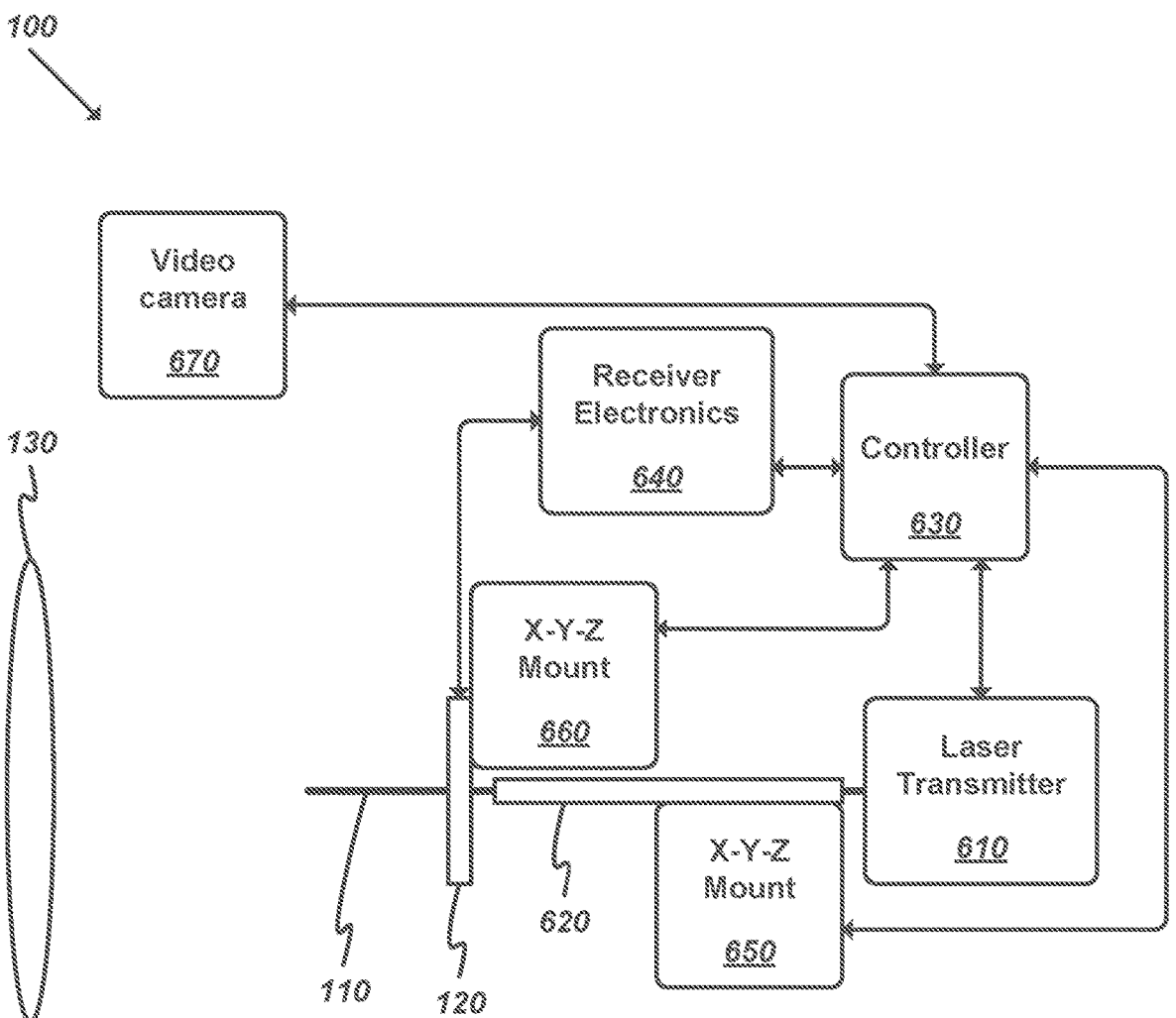
FIG. 6 illustrates a schematic block diagram of the optical transmitter/receiver of one or more embodiments.

FIG. 6 illustrates a schematic block diagram of the optical transmitter/receiver 100 of one or more embodiments. As shown, in addition to the optical fiber 110, photodetector 120, and collimation lens 130 described above, the optical transmitter/receiver 100 may include a laser transmitter 610, a fiber holder 620, a controller 630, receiver electronics 640, a first x-y-z mount 650, a second x-y-z mount 660, a video camera 670, and/or other relevant components (e.g., one or more network gateways, video processing and/or recording components, communication interface, user interface features, etc.).

The optical transmitter/receiver 100 may include various other physical elements, such as a base, various supports, a housing, etc. Some such components may include various opaque surfaces or coatings, as appropriate. For instance, a housing may extend from collimation lens 130 to laser transmitter 610, where the housing may have an opaque inner surface that prevents leakage of transmitted or reflected light.

Laser transmitter 610 may be an opto-electronic device that is able to generate information coded (modulated) laser or other optical outputs based on instructions or commands received from controller 630 (or other appropriate resources).

Fiber holder 620 may be, include, and/or otherwise utilize a housing such as a cylindrical tube that may be able to support and/or protect at least a portion of optical fiber 110.

Controller 630 may be an electronic device capable of executing instructions and/or otherwise processing data. Controller 630 may be able to at least partly direct the operations of the various other components of the optical transmitter/receiver 100 (e.g., via control signals or messaging).

Receiver electronics 640 may include components such as a transimpedance amplifier. Receiver electronics 640 may convert data received from photodetector 120 to a set of digital and/or analog signals that are able to be sent to controller 630. In some embodiments, the photodetector 120 may be mounted on the same board as receiver electronics 640. Controller 630 may be able to filter and/or otherwise process such received signals such that desired communication attributes may be achieved (e.g., bandwidth, signal-to-noise ratio, etc.). Components of receiver electronics 640, such as transimpedance amplifiers, are described in more detail in U.S. patent application Ser. No. 18/099,278.

First x-y-z-mount 650 may be associated with the fiber holder 620 and optical fiber 110. The first x-y-z mount 650 may be used to adjust the position of optical fiber 110 to be aligned with the optical axis of the collimation lens and the position fiber tip to the focal point of the collimation lens 130. In some embodiments, controller 630 may at least partially control the operation of first x-y-z mount 650 and may utilize resources such as sensors (e.g., position sensors, cameras, etc.) to automatically position the optical fiber 110 with respect to collimation lens 130.

Second x-y-z mount 660 may be associated with the photodetector 120. The second x-y-z mount 660 may be coupled to the first x-y-z mount 650. The second x-y-z mount 660 may be used to adjust the position of the photodetector 120 relative to the output of the optical fiber 110 in order to have the optical fiber 110 pass through the photodetector 120. In some embodiments, controller 630 may at least partially control the operation of second x-y-z mount 660 and may utilize resources such as sensors (e.g., position sensors, cameras, etc.) to automatically position the photo detector 120 with respect to the optical fiber 110.

Video camera 670 and/or other appropriate sensors may be used to help locate retroreflectors 150. If a retroreflector 150 is relatively far away, video camera 670 may capture image data that may be analyzed by controller 630 to determine location(s) of available retroreflectors 150.

Figure 7:
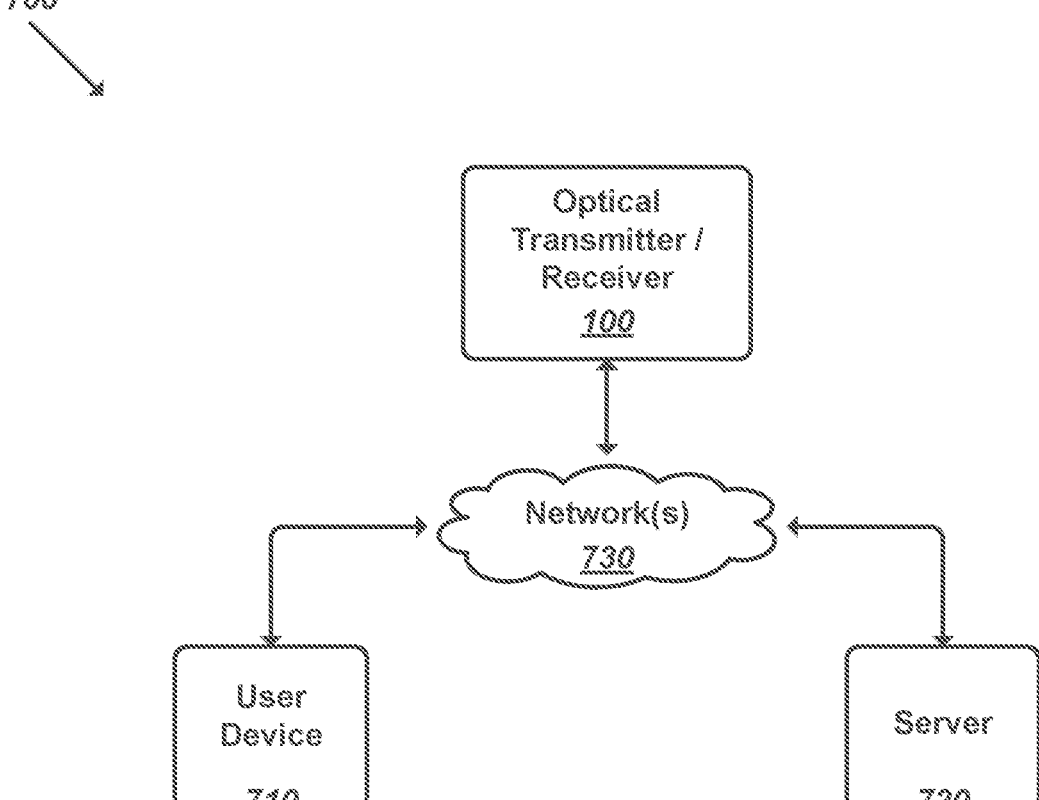
FIG. 7 illustrates a schematic block diagram of an example environment of one or more embodiments described herein.

FIG. 7 illustrates a schematic block diagram of an example environment 700 of one or more embodiments described herein. Optical transmitter/receiver 100 may include various communication features, such as network interfaces, cellular communication and/or other wireless communication components, etc. that may be allow the optical transmitter/receiver 100 to communicate across non-optical channels with various appropriate components, devices, and/or systems.

User device 710 may be an electronic device such as a smartphone, tablet, personal computer, wearable device, and/or other appropriate devices. User device 710 may include user interface components (e.g., a touchscreen, displays, buttons, keypads, etc.) that may be utilized in conjunction with optical transmitter/receiver 100.

Server 720 may be a network-accessible computing device that may be able to interact with optical transmitter/receiver 100. Server 720 may be able to execute instructions and/or otherwise process data. In some embodiments, a server 720 associated with a system of some embodiments may provide information such as retroreflector location information. For instance, server 720 may provide a lookup table, location map, or other appropriate data structure that lists available retroreflectors. Each retroreflector may be associated with a unique identifier such as a serial number that may indicate identification and/or location information.

Network(s) 730 may include wired networks (e.g., Ethernet), wireless networks (e.g., Wi-Fi, cellular networks, the Internet, etc.), wired or wireless communication channels (e.g., universal serial bus (USB), Bluetooth, etc.), and/or other appropriate communication channels.

Figure 8:
FIG. 8 illustrates a flow chart of an exemplary process that locates and identifies retroreflectors.
Figure 8:
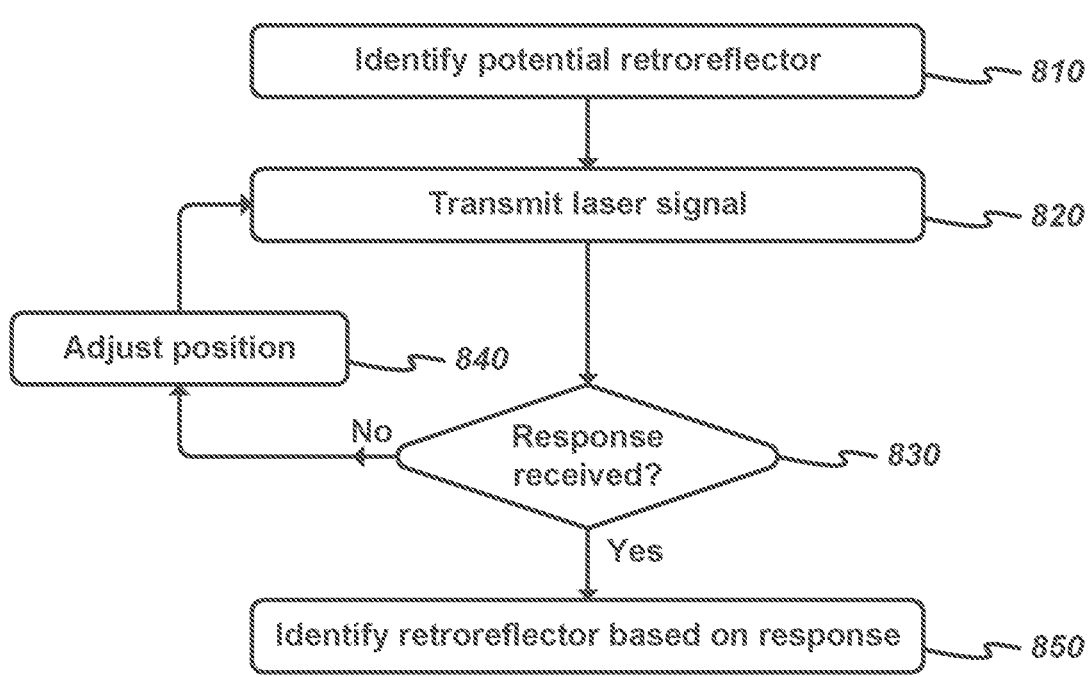

FIG. 8 illustrates an example process 800 for locating and identifying retroreflectors, such as retroreflector 150. The process may allow optical transmitter/receiver 100 to establish a connection with one or more retroreflectors, and receive identifying information related to the connected retroreflector The process may be performed when optical transmitter/receiver 100 is powered on, when communications are initiated, and/or under other appropriate conditions. In some embodiments, process 800 may be performed by optical transmitter/receiver 100.

As shown, process 800 may include identifying (at 810) a potential retroreflector. A potential retroreflector may be identified or selected in various appropriate ways. For instance, optical transmitter/receiver 100 may receive a listing of nearby retroreflectors 150 from a resource such as server 720. In some embodiments, optical transmitter/receiver 100 may maintain such a listing, and request periodic updates based on various relevant criteria (e.g., time elapsed since last update, distance moved since last update, etc.). In some cases, a user may utilize a physical resource such as a map of retroreflector locations to identify potential retroreflectors. The listing or other resource may indicate retroreflector information such as unique identifier, location, retroreflector type, capability (e.g., passive or active), and/or other relevant information related to the retroreflectors.

Process 800 may include transmitting (at 820) a laser signal. Such a signal may be transmitted as described in reference to FIG. 1 above.

Returning to FIG. 8, the process may include determining (at 830) whether a response has been received. Such a determination may be made in various appropriate ways, such as by analyzing data received via photodetector 120 and receiver electronics 640.

As shown, if process 800 determines (at 830) that a response has not been received, the process may include adjusting (at 840) a position of the optical transmitter receiver 100. The position of the optical transmitter/receiver 100 may be adjusted in various appropriate ways using various appropriate components. For instance, optical transmitter/receiver 100 may be mounted on a resource such as a gimble that may be used to scan a region or area until a response signal is received. As another example, a user such as a soldier may scan by hand using a user device 710 such as a smartphone.

If process 800 determines (at 830) that a response has been received, the process may include identifying (at 850) the retroreflector based on the response. In some embodiments, the retroreflector 150 may be a modulating retroreflector that is able to selectively reflect or not reflect received signals. Thus, optical transmitter/receiver 100 may send a series of pulses and the retroreflector 150 may return a subset of the received pulses, which may indicate identifying information, such as the serial number or other unique identifier associated with the retroreflector 150.

The retroreflector information may be utilized in various appropriate ways. For instance, a lookup table or similar resource may be used to receive information related to the retroreflector 150. As another example, a request for information may be sent to a resource such as server 720. Optical transmitter/receiver 100 may perform PNT operations based on the information associated with the retroreflector 150 (e.g., location of the retroreflector, type of retroreflector, etc.), and/or otherwise utilize the received information.

Figure 9:
FIG. 9 illustrates a flow chart of an exemplary process that communicates over an optical channel.
Figure 9:
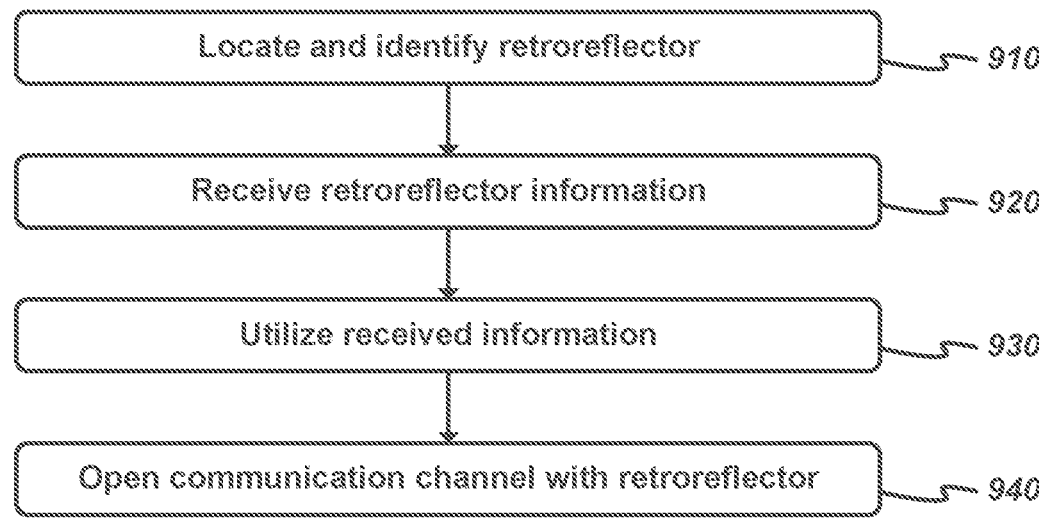

FIG. 9 illustrates an example process 900 for communicating over an optical channel. The process may allow optical transmitter/receiver 100 to communicate with one or more retroreflectors 150 once a connection has been established. The process may be performed when optical transmitter/receiver 100 is powered on, when a message is received for transmission, and/or under other appropriate conditions. In some embodiments, process 900 may be performed by optical transmitter/receiver 100.

As shown, process 900 may include locating and identifying (at 910) a retroreflector. Retroreflectors may be located and identified using a process similar to process 800.

Process 900 may include receiving (at 920) retroreflector information. As above, a lookup table or similar resource may be used to receive information related to the retrore-flector 150. As another example, a request for information may be sent to a resource such as server 720.

The process may include utilizing (at 930) the received information. As described above, the received information may be utilized to determine information such as position, by determining a location of one or more of the identified retroreflectors 150 and using the retroreflector location information to determine a position of the optical transmit-ter/receiver 100.

As shown, process 900 may include opening (at 940) a communication channel with the retroreflector. Such a com-munication channel may allow two-way communication between the optical transmitter/receiver 100 and a resource associated with the retroreflector 150 (e.g., a satellite, a user device such a smartphone, etc.). Messages may be sent from the optical transmitter/receiver via a series of pulses. The retroreflector 150 may, in turn, return a subset of the pulses to the optical transmitter/receiver 100 and the received pulses may be mapped to various messages or data, as appropriate.

One of ordinary skill in the art will recognize that pro-cesses 800-900 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in par-allel. Elements or sets of elements may be performed continuously and/or at regular intervals.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 10:
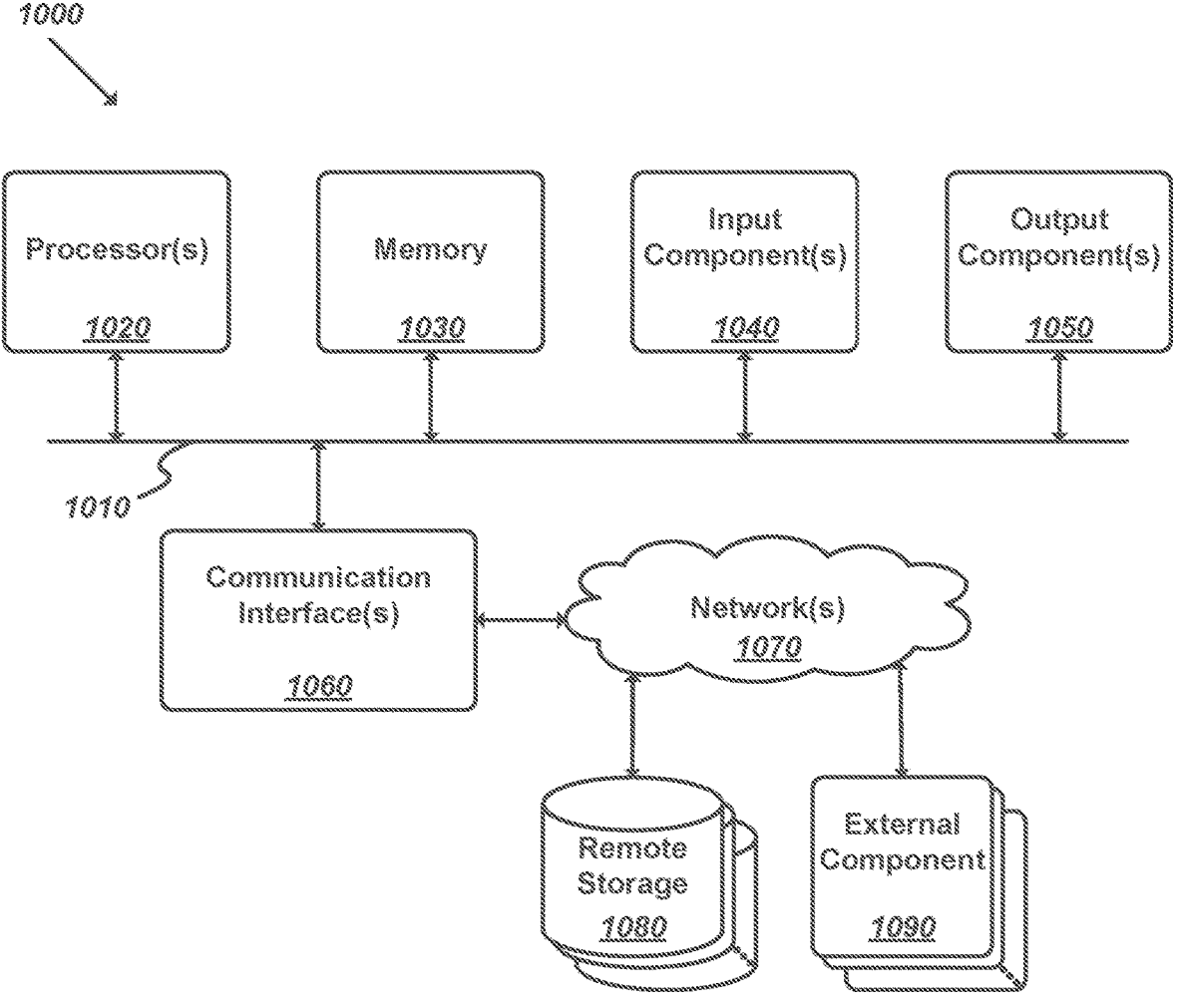
FIG. 10 illustrates a schematic block diagram of one or more exemplary devices used to implement various embodiments.

FIG. 10 illustrates a schematic block diagram of an exemplary device (or system or devices) 1000 used to implement some embodiments. For example, the systems, devices, components, and/or operations described above in reference to FIG. 1-FIG. 7 may be at least partially imple-mented using device 1000. As another example, the pro-cesses described in reference to FIG. 8 and FIG. 9 may be at least partially implemented using device 1000.

Device 1000 may be implemented using various appro-priate elements and/or sub-devices. For instance, device 1000 may be implemented using one or more personal computers (PCs), servers, mobile devices (e.g., smart-phones), tablet devices, wearable devices, and/or any other appropriate devices. The various devices may work alone (e.g., device 1000 may be implemented as a single smart-phone) or in conjunction (e.g., some components of the device 1000 may be provided by a mobile device while other components are provided by a server).

As shown, device 1000 may include at least one commu-nication bus 1010, one or more processors 1020, memory

1030, input components 1040, output components 1050, and one or more communication interfaces 1060.

Bus 1010 may include various communication pathways that allow communication among the components of device 1000. Processor 1020 may include a processor, micropro-cessor, microcontroller, DSP, logic circuitry, and/or other appropriate processing components that may be able to interpret and execute instructions and/or otherwise manipu-late data. Memory 1030 may include dynamic and/or non-volatile memory structures and/or devices that may store data and/or instructions for use by other components of device 1000. Such a memory device 1030 may include space within a single physical memory device or spread across multiple physical memory devices.

Input components 1040 may include elements that allow a user to communicate information to the computer system and/or manipulate various operations of the system. The input components may include keyboards, cursor control devices, audio input devices and/or video input devices, touchscreens, motion sensors, etc. Output components 1050 may include displays, touchscreens, audio elements such as speakers, indicators such as light-emitting diodes (LEDs), printers, haptic or other sensory elements, etc. Some or all of the input and/or output components may be wirelessly or optically connected to the device 1000.

Device 1000 may include one or more communication interfaces 1060 that are able to connect to one or more networks 1070 or other communication pathways. For example, device 1000 may be coupled to a web server on the Internet such that a web browser executing on device 1000 may interact with the web server as a user interacts with an interface that operates in the web browser. Device 1000 may be able to access one or more remote storages 1080 and one or more external components 1090 through the communi-cation interface 1060 and network 1070. The communica-tion interface(s) 1060 may include one or more application programming interfaces (APIs) that may allow the device 1000 to access remote systems and/or storages and also may allow remote systems and/or storages to access device 1000 (or elements thereof).

It should be recognized by one of ordinary skill in the art that any or all of the components of computer system 1000 may be used in conjunction with some embodiments. More-over, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 1000 may perform various operations in response to processor 1020 executing software instructions stored in a computer-readable medium, such as memory 1030. Such operations may include manipulations of the output com-ponents 1050 (e.g., display of information, haptic feedback, audio outputs, etc.), communication interface 1060 (e.g., establishing a communication channel with another device or component, sending and/or receiving sets of messages, etc.), and/or other components of device 1000.

The software instructions may be read into memory 1030 from another computer-readable medium or from another device. The software instructions stored in memory 1030 may cause processor 1020 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. An optical communication device, comprising:
an optical fiber;
a single annular photodetector; and
a collimation lens,
wherein the optical fiber passes through a center of the annular photodetector and an output of the optical fiber is passed through the collimation lens.

2. The optical communication device of claim 1, wherein the optical fiber is positioned such that the output of the optical fiber is aligned with a focal point of the collimation lens.

3. The optical communication device of claim 1, wherein the annular photodetector is positioned such that the annular photodetector is offset from a focal plane of the collimation lens.

4. The optical communication device of claim 3, wherein the offset from the focal plane of the collimation lens is approximately equal to a diameter of the annular photodetector.

5. The optical communication device of claim 1, further comprising a first x-y-z mount coupled to a fiber holder that houses a portion of the optical fiber, wherein the first x-y-z mount is configured to position the optical fiber relative to the collimation lens.

6. The optical communication device of claim 5, further comprising a second x-y-z mount coupled to the first x-y-z mount and the annular photodetector, wherein the second x-y-z mount is configured to position the annular photodetector relative to the optical fiber.

7. The optical communication device of claim 1, wherein the annular photodetector receives the output of the optical fiber after the output of the optical fiber traverses a certain distance in free-space and is reflected from at least one retroreflector.

8. An optical communication system comprising:
an optical communication device comprising:
an optical fiber;
an annular photodetector; and
a collimation lens,
wherein the optical fiber passes through a center of the annular photodetector and an output of the optical fiber is passed through the collimation lens, and
wherein the annular photodetector receives the output of the optical fiber reflected from at least one retroreflector.

9. The optical communication system of claim 8, wherein the optical fiber is positioned such that the output of the optical fiber is aligned with a focal point of the collimation lens.

10. The optical communication system of claim 8, wherein the annular photodetector is positioned such that the annular photodetector is offset from a focal plane of the collimation lens.

11. The optical communication system of claim 10, wherein the offset from the focal plane of the collimation lens is approximately equal to a diameter of the annular photodetector.

12. The optical communication system of claim 8, further comprising a first x-y-z mount coupled to a fiber holder that houses a portion of the optical fiber, wherein the first x-y-z mount is configured to position the optical fiber relative to the collimation lens.

13. The optical communication system of claim 12, further comprising a second x-y-z mount coupled to the first x-y-z mount and the annular photodetector, wherein the second x-y-z mount is configured to position the annular photodetector relative to the optical fiber.

14. The optical communication system of claim 8, wherein the received output of the optical fiber reflected from the at least one retroreflector comprises identifying information associated with the at least one retroreflector.

15. A method comprising:

transmitting, from an optical communication device according to claim 1, an optical signal;

receiving, at the optical communication device, a response to the optical signal from a retroreflector; and determining a unique identifier associated with the retroreflector based on the response.

16. The method of claim 15 further comprising receiving information related to the retroreflector based on the unique identifier.

17. The method of claim 16, wherein the retroreflector is an active retroreflector.

18. The method of claim 15, wherein the optical signal is transmitted via the optical fiber and the collimation lens.

19. The method of claim 18, wherein the response to the optical signal is received via the collimation lens and the annular photodetector at least partially surrounds a portion of the optical fiber.

20. The method of claim 19, wherein the annular photodetector is positioned at a location that is offset from a focal plane of the collimation lens.

21. An optical communication device, comprising:

an optical fiber;

multiple multi-mode fibers that form a fiber bundle;

a photodetector connected to the fiber bundle; and a collimation lens, wherein the optical fiber is located at the center of the fiber bundle and an output of the optical fiber is passed through the collimation lens.

22. The optical communication device of claim 21, wherein there are six or more multi-mode fibers.

\* \* \* \* \*